Jan. 7, 1964  H. L. WILSON  3,117,181
SUPPORT FOR POWER LINE CONDUCTOR WITH OVERLOAD RELEASE
Filed March 21, 1962
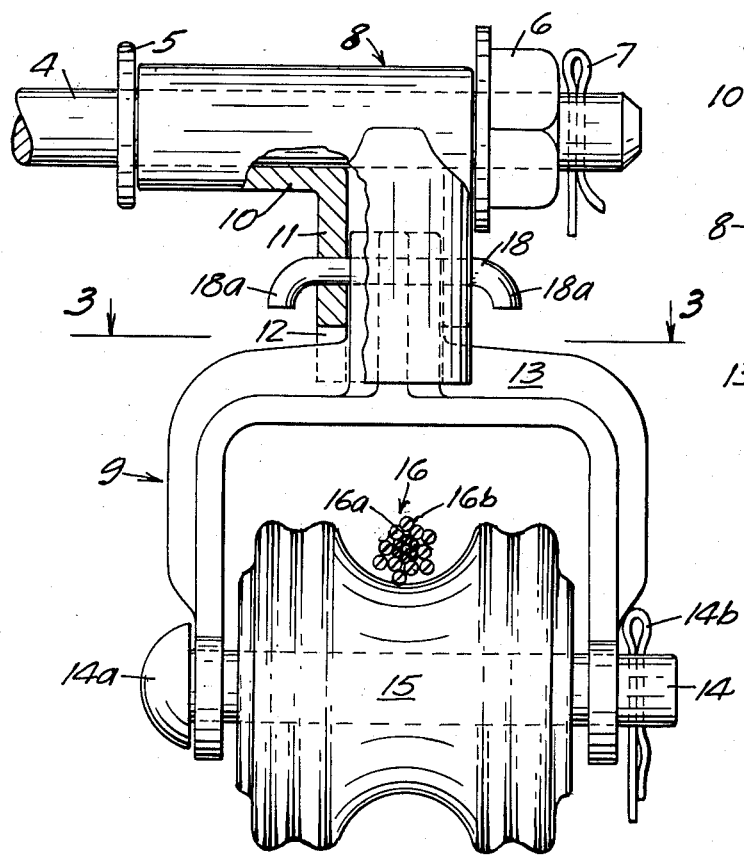
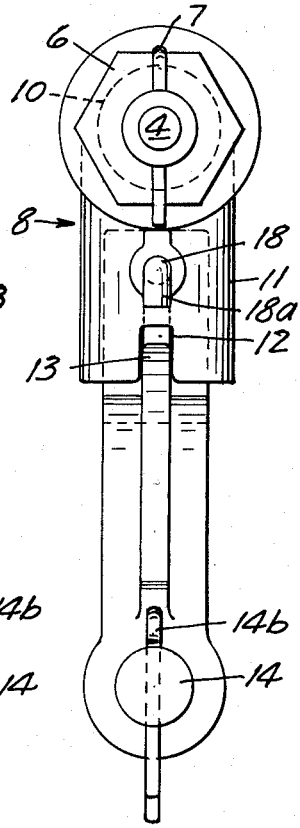
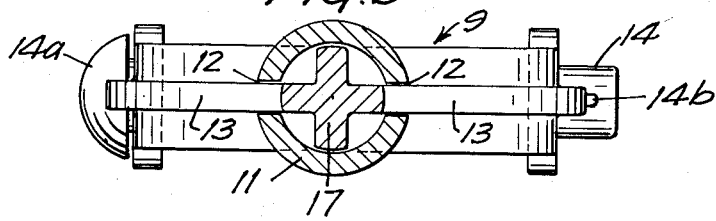
INVENTOR
HILDING L. WILSON
(DECEASED)
BY HELEN O. WILSON
(ADMINISTRATOR)
BY
John E. Stryker
ATTORNEY

United States Patent Office 3,117,181
Patented Jan. 7, 1964

3,117,181
SUPPORT FOR POWER LINE CONDUCTOR
WITH OVERLOAD RELEASE
Hilding L. Wilson, deceased, late of Webster, S. Dak., by Helen O. Wilson, administratrix, Webster, S. Dak.
Filed Mar. 21, 1962, Ser. No. 181,485
7 Claims. (Cl. 174—162)

This invention relates to an improved support for electric power lines of the overhead or high line type, and particularly to means for releasing a line conductor so that it falls to the ground when it becomes heavily overloaded by adhering ice formations or from other cause.

In many temperate zone areas of the United States and elsewhere in the world, more or less frequent weight overloading of the overhead power line conductors has been caused by accumulations of ice on the conductors. Such overloading has created serious and expensive maintenance problems. In some rural areas, for example, the supporting poles are widely spaced and under adverse weather conditions the weight of ice formations adhering to the conductors becomes so great that the supporting poles or other supports are broken, thereby dropping the conductors to the ground, causing short circuits, interrupted service and danger of electrocution to human beings and livestock. Replacement of the broken poles and other repairs required before service can be restored is a slow and expensive procedure, particularly in winter when the ground is frozen. Usually two or more power transmission lines are supported on insulators mounted on the elevated supporting structure so that each power line includes at least one high voltage live or "hot" conductor and at least one grounded conductor cable.

According to the present invention, one of the conductors supported on a pole is provided with a support which will allow the conductor to drop to the ground when subjected to a predetermined overload weight of adhering ice or other overload weight thereon. When the improved supporting device releases one of the conductors, the stress on the supporting pole or other main support is relieved sufficiently so that the pole or main support is not broken and the power supply service may be continued over the other power lines carried by the support. Maximum benefits are obtained by supporting only the grounded conductors on the releasable supports. This will be evident when it is considered that the dropping of the grounded or neutral line to the ground cannot cause an interruption of the power transmission service or injury to humans or livestock that come in contact with the dropped line.

It is, therefore, an object of the present invention to provide supporting means for an elevated power line conductor including means for releasing the conductor when it is subjected to a predetermined overload weight.

A particular object is to provide a conductor support of the class described having upper and lower interlocking hanger members connected together by a shear pin, and so formed as to protect the shear pin against wear and resulting weakening of the support caused by wind and swaying and other generally horizontal relative movement of the conductor and supporting structure.

A further and particular object is to provide a support of the class described having upper and lower hanger members including vertically elongated interlocking stud and socket members which protect a shear pin connecting the stud to the socket member from wear and breakage under shear loads of substantially less weight than those of a predetermined release value.

A further object is to provide such a support and release device which is simple, inexpensive to manufacture, and economical to install and maintain.

Other objects will appear and be more fully pointed out in the following specification and claims.

Referring to the accompanying drawing which illustrates, by way of example and not for the purpose of limitation, a preferred embodiment of the invention:

FIGURE 1 is a part side elevational and part sectional view showing the improved conductor supporting means including a sectional view of the conductor;

FIG. 2 is an end view of the device as seen from the right of FIG. 1, and

FIG. 3 is a horizontal sectional view taken on the line 3—3 of FIG. 1.

In the drawing, one type of conventional high line support is indicated by the numerals 4–7 inclusive. The member 4 is a horizontally elongated member rigidly supported at an end, not shown, in an elevated position on a pole, tower or the like. The member 4 has a collar 5 fixed thereon and an opposite end portion upon which a nut 6 is threaded for confining the line suspending device thereon. A cotter key indicated at 7 may be inserted through an aperture in the member 4 to lock the nut 6 in place.

Upper and lower hanger members are indicated generally by the numerals 8 and 9 respectively. The member 8 has a sleeve portion 10 adapted to embrace and be supported on the horizontal member 4, and a vertically elongated socket member 11 depends from the sleeve portion 10 and is detachably connected to the hanger member 9. The lower end portion of the member 11 is formed with a laterally extending slot 12 adapted to fit in interlocking relation with upstanding flanges 13 formed on the hanger member 9.

This lower hanger member is of generally inverted U shape and has lower end portions which are perforated to receive a horizontally extending pin 14 extending axially through a cylindrical opening in an insulator 15 of generally spool shape. One end of the pin 14 may be formed with a head 14a and the other end portion may be perforated transversely to receive a cotter key 14b. A conductor cable indicated generally at 16 is adapted to be supported on the upper periphery of the insulator 15. In accordance with the conventional power line arrangement, the cable 16 extends generally in a horizontal direction from one support to another so that the entire weight of the cable is supported on the insulator 15 and similar insulators suitably spaced along the line. Further, in accordance with conventional practice, the conductor cable 16 may have a core comprising a conducting wire cable 16a enclosed and protected against localized stress by armor cable wires 16b in the vicinity of each support.

Projecting upwardly from the hanger member 9, and preferably formed integrally therewith, is a vertically elongated stud member 17 which fits in the socket member 11. Horizontally aligned apertures are formed in the socket member 11 and stud member 17 to receive a shear pin indicated generally at 18. As shown, this shear pin has laterally bent end portions 18a which retain it in place in the socket and stud apertures.

As an example, for an installation where the shear pin normally must withstand a weight load equal to approximately 100 pounds, the shear pin 18 may be formed from an aluminum wire $\tfrac{3}{16}$ of an inch in diameter and of such composition as to release the line when the stress caused by an abnormal load reaches approximately 500 pounds.

When in use, the entire weight of the conductor 16 and lower hanger member 9 is normally carried on the shear pin 18. As a result of the interlocking formation of the stud member 17 and socket member 11, the upper and lower hanger members are securely retained against relative movement in a horizontal plane. Thus the varying stresses usually caused by the wind acting on the conductor 16 and its supporting members are transmitted directly from one of the hanger members to the other, so that the shear pin is protected against wear and gradual weakening that would otherwise result from such stresses. Malfunctioning and release of the conductor under weight loads substantially lower than the predetermined rated or intended resistance to shear are thereby minimized. Maintenance and repair costs are also thereby minimized.

Extensive tests of the invention herein described have demonstrated that it secures a number of advantageous results, including reliable protection of the main supporting structure comprising a pole or tower against breakage under overloading weight stress caused by adhering ice formations or other overload. Other advantageous features are the low cost of original installation and low cost of maintenance of the device herein described and claimed.

What is claimed is:

1. An elevated support for a power line conductor comprising, fixed supporting means, upper and lower hanger members depending from said supporting means, having vertically elongated stud and socket members fitting in interlocking engagement one with the other and including means for locking said members against relative movement in a horizontal plane, said stud and socket member being formed with aligned substantially horizontally disposed apertures, means confining said upper hanger member against horizontal rotary and vertical movement relative to said supporting means, a shear pin fitting in said apertures and normally supporting one of said hanger members from the other, and means for supporting a power line conductor on said lower hanger member, said shear pin being adapted to release said lower hanger member and conductor when the latter is subjected to a predetermined downwardly directed overload weight.

2. A support for a power line conductor in accordance with claim 1 in which said lower hanger member comprises, an inverted U shaped member and said means for supporting a power line conductor on said lower hanger member comprise a substantially horizontally extending pin connecting the lower end portions of said hanger member and an annular insulator supported on said pin.

3. A support for a power line conductor in accordance with claim 1, and a power line conductor supported on said lower hanger member.

4. A conductor support in accordance with claim 2 and a power line conductor supported on the upper periphery of said annular insulator.

5. A support for a power line conductor in accordance with claim 1 in which said means for locking said hanger members against relative movement in a horizontal plane comprise substantially radially extending portions of said stud and socket members formed on said upper and lower hanger members respectively.

6. A support for a power line conductor in accordance with claim 1 in which said socket member is an integral part of said upper hanger member and said stud member is integral with said lower hanger member.

7. A support for a power line conductor in accordance with claim 1 in which said fixed supporting means includes a rigid substantially horizontal member, and said upper hanger member is formed with a horizontally elongated sleeve portion embracing said horizontal member.

References Cited in the file of this patent

UNITED STATES PATENTS

| | | |
|---|---|---|
| 989,231 | Chamberlain | Apr. 11, 1911 |
| 1,282,876 | Kyle | Oct. 29, 1918 |
| 2,589,726 | Neufeld | Mar. 18, 1952 |
| 2,665,128 | Guffey | Jan. 5, 1954 |
| 2,931,606 | Fraser et al. | Apr. 5, 1960 |